(12) United States Patent
Matsuoka et al.

(10) Patent No.: US 7,426,232 B2
(45) Date of Patent: Sep. 16, 2008

(54) SIGNAL SELECTION SYSTEMS

(75) Inventors: Hidehiro Matsuoka, Kanagawa-ken (JP); Yong Sun, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 768 days.

(21) Appl. No.: 10/352,125

(22) Filed: Jan. 28, 2003

(65) Prior Publication Data

US 2004/0008614 A1   Jan. 15, 2004

(30) Foreign Application Priority Data

Jan. 28, 2002  (GB) ................................ 0201897.6

(51) Int. Cl.
  *H04B 1/00*  (2006.01)
  *H04L 1/02*  (2006.01)
(52) U.S. Cl. ...................................... 375/148; 375/347
(58) Field of Classification Search ................ 375/148, 375/200, 206, 347, 349; 370/206, 208, 210, 370/343, 480; 455/133, 561, 562.1
See application file for complete search history.

(56) References Cited

U.S. PATENT DOCUMENTS

| | | | | |
|---|---|---|---|---|
| 4,355,411 | A * | 10/1982 | Reudink et al. ............. | 455/437 |
| 6,141,393 | A | 10/2000 | Thomas et al. | |
| 6,292,519 | B1 * | 9/2001 | Popovic ....................... | 375/346 |
| 6,470,192 | B1 * | 10/2002 | Karlsson et al. ............. | 455/561 |
| 6,477,213 | B1 * | 11/2002 | Miyoshi et al. ............. | 375/347 |
| 6,603,961 | B1 * | 8/2003 | Kuroda ........................ | 455/133 |
| 6,947,507 | B2 * | 9/2005 | Kelkar et al. ................. | 375/347 |
| 7,043,275 | B2 * | 5/2006 | Matsuoka et al. ......... | 455/562.1 |
| 2003/0002471 | A1 * | 1/2003 | Crawford et al. ............ | 370/343 |
| 2003/0053412 | A1 * | 3/2003 | Yoshida et al. .............. | 370/208 |
| 2006/0294170 | A1 * | 12/2006 | Matsuoka et al. ........... | 708/300 |

FOREIGN PATENT DOCUMENTS

CN              1151228 A         6/1997

* cited by examiner

*Primary Examiner*—Mohammad Ghayour
*Assistant Examiner*—Lawrence B Williams
(74) *Attorney, Agent, or Firm*—Oblon, Spivak, McClelland, Maier & Neustadt, P.C.

(57) ABSTRACT

A received signal selector for a received signal, the received signal including a set of carriers, the received signal selector being configured for use with an antenna system including a plurality of antenna elements. The received signal selector includes a plurality of received signal inputs for receiving signals from the plurality of antenna elements, an interference detector for each of the received signals inputs, coupled to the received signal inputs to receive, from each input, a version of the received signal, and configured to provide an interference output for the set of carriers from each input, a selection controller configured to receive the interference output for each input and having a control output, and a selector coupled to the received signal inputs and responsive to the control output to select one or more of the versions of the received signal for output. The invention provides a simplified technique for mitigating the effects of co-channel interference and severe multipath distortion.

31 Claims, 7 Drawing Sheets

SIGNAL SELECTION SYSTEMS

FIELD OF THE INVENTION

This invention relates to improved antenna techniques, particularly for Orthogonal Frequency Division Multiplexed (OFDM) communication systems.

BACKGROUND OF THE INVENTION

Figure 1A:
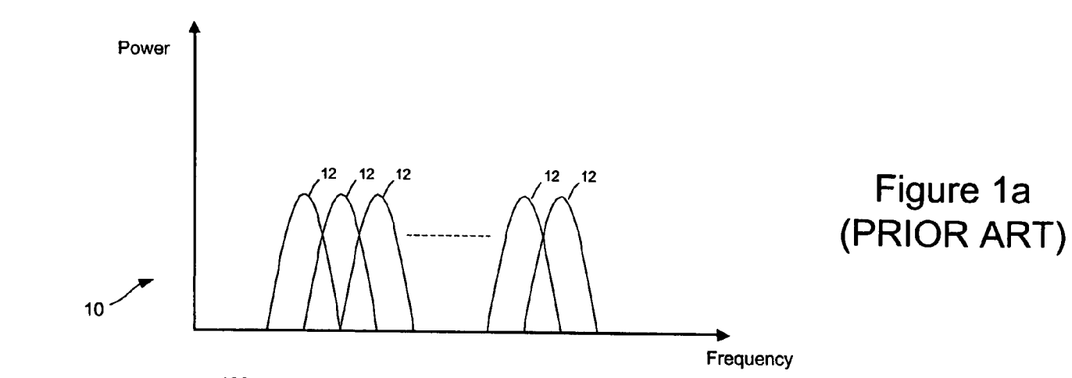
FIGS. 1a and 1b show, respectively, an OFDM symbol and an exemplary OFDM transmitter.

Orthogonal frequency division multiplexing is a well-known technique for transmitting high bit rate digital data signals. Rather than modulate a single carrier with the high speed data, the data is divided into a number of lower data rate channels each of which is transmitted on a separate subcarrier. In this way the effect of multipath fading is mitigated. In an OFDM signal the separate subcarriers are spaced so that they overlap, as shown for subcarriers 12 in spectrum 10 of FIG. 1a. The subcarrier frequencies are chosen that so that the subcarriers are mutually orthogonal, so that the separate signals modulated onto the subcarriers can be recovered at the receiver. One OFDM symbol is defined by a set of symbols, one modulated onto each subcarrier (and therefore corresponds to a plurality of data bits). The subcarriers are orthogonal if they are spaced apart in frequency by an interval of 1/T, where T is the OFDM symbol period.

An OFDM symbol can be obtained by performing an inverse Fourier transform, preferably an Inverse Fast Fourier Transform (IFFT), on a set of input symbols. The input symbols can be recovered by performing a Fourier transform, preferably a fast Fourier transform (FFT), on the OFDM symbol. The FFT effectively multiplies the OFDM symbol by each subcarrier and integrates over the symbol period T. It can be seen that for a given subcarrier only one subcarrier from the OFDM symbol is extracted by this procedure, as the overlap with the other subcarriers of the OFDM symbol will average to zero over the integration period T.

Often the subcarriers are modulated by QAM (Quadrature Amplitude Modulation) symbols, but other forms of modulation such as Phase Shift Keying (PSK) or Pulse Amplitude Modulation (PAM) can also be used. To reduce the effects of multipath OFDM symbols are normally extended by a guard period at the start of each symbol. Provided that the relatively delay of two multipath components is smaller than this guard time interval there is no inter-symbol interference (ISI), at least to a first approximation.

Figure 1B:
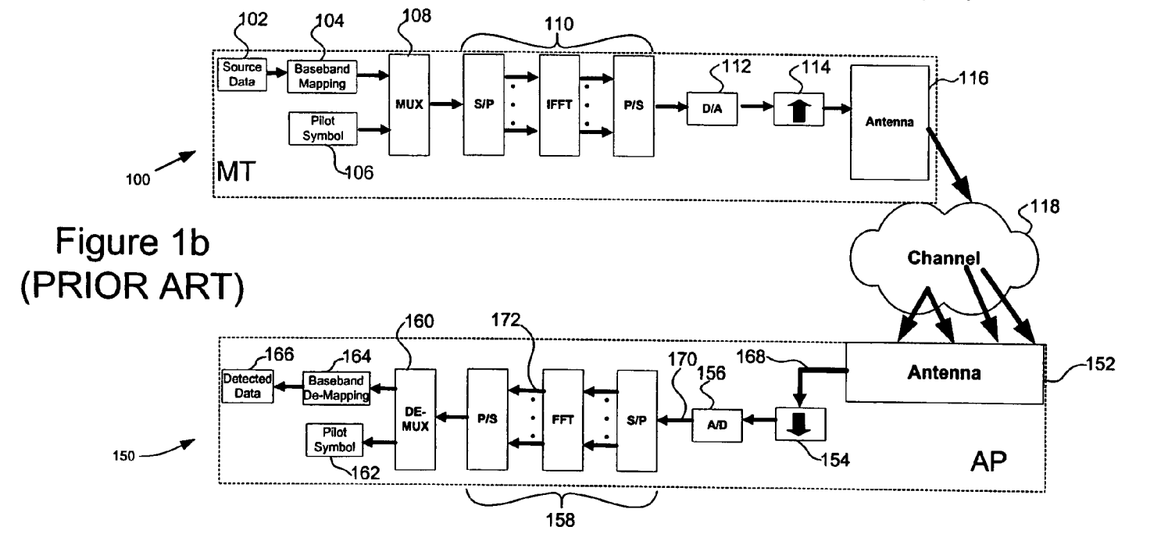

FIG. 1b shows an exemplary OFDM transmitter 100 (here in a mobile terminal, MT) and an exemplary OFDM receiver 150 (here in an access point, AP). In the transmitter 100 a source 102 provides data to a baseband mapping unit 104, which optionally provides forward error correction coding and interleaving, and which outputs modulated symbols such as QAM symbols. The modulated symbols are provided to a multiplexer 108 which combines them with pilot symbols from a pilot symbol generator 106, which provides reference amplitudes and phases for frequency synchronisation and coherent detection in the receiver (in other arrangements differential detection may be employed). The combination of blocks 110 converts the serial data stream from multiplexer 108 to a plurality of parallel, reduced data rate streams, performs an IFFT on these data streams to provide an OFDM symbol, and then converts the multiple subcarriers of this OFDM symbol to a single serial data stream. This serial (digital) data stream is then converted to an analogue time-domain signal by digital-to-analogue converter 112, up-converted by up-converter 114, and after filtering and amplification (not shown) output from an antenna 116. Antenna 116 may comprise an omnidirectional antenna, a sectorised antenna or an array antenna with beamforming.

The signal from antenna 116 of transmitter 100 is received by an antenna 152 of receiver 150 via a "channel" 118. Typically the signal arrives at antenna 152 as a plurality of multipath components, with a plurality of different amplitudes and phases, which have propagated via a plurality of different channels or paths. These multipath components combine at the receiver and interfere with one another to provide an overall channel characteristic typically having a number of deep nulls, rather like a comb, which generally change with time (particularly where the transmitter or receiver is moving). Often there will be a number of transmitters in the same general location, for example an office, and this gives rise to co-channel interference, which can be more problematic than multipath.

The antenna 152 of receiver 150 is coupled to a down-converter 154 and to an analogue-to-digital converter 156. Blocks 158 then perform a serial-to-parallel conversion, FFT, and parallel-to-serial re-conversion, providing an output to demultiplexer 160, which separates the pilot symbol signal 162 from the data symbols. The data symbols are then demodulated and de-mapped by base-band de-mapping unit 164 to provide a detected data output 166. Broadly speaking the receiver 150 is a mirror image of the transmitter 100. The transmitter and receiver may be combined to form an OFDM transceiver.

OFDM techniques may be employed in a variety of applications and are used, for example, for military communication systems and high definition TV. Here, applications of the invention will be discussed with particular reference to the HIPERLAN (High Performance Radio Local Area Network) Type 2 standard (www.etsi.org/technicalactiv/hiperlan2.htm, and DTS/BRAN-0023003 v 0.k). Although applications of the invention are not limited to this environment HIPERLAN 2 wireless local area network communications are managed by a common node, the access point.

The receiver of FIG. 1b is somewhat simplified as, in practice, there is a need to synchronise the FFT window to each OFDM symbol in turn, to avoid introducing non-orthogonality and hence ISI/ICI (Inter-Symbol Interference/Inter-Carrier Interference). This may be done by auto-correlating an OFDM symbol with the cyclic extension of the symbol in the guard period but it is generally preferable, particularly for packet data transmission, to use known OFDM (training) symbols which the receiver can accurately identify and locate, for example using a matched filter. It will be appreciated that this matched filter operates in the time domain, that is before the FFT is carried out (as opposed to the post-FFT frequency domain). In a packet data system data packets may be provided with a preamble including one or more of these training symbols.

Figure 2A:
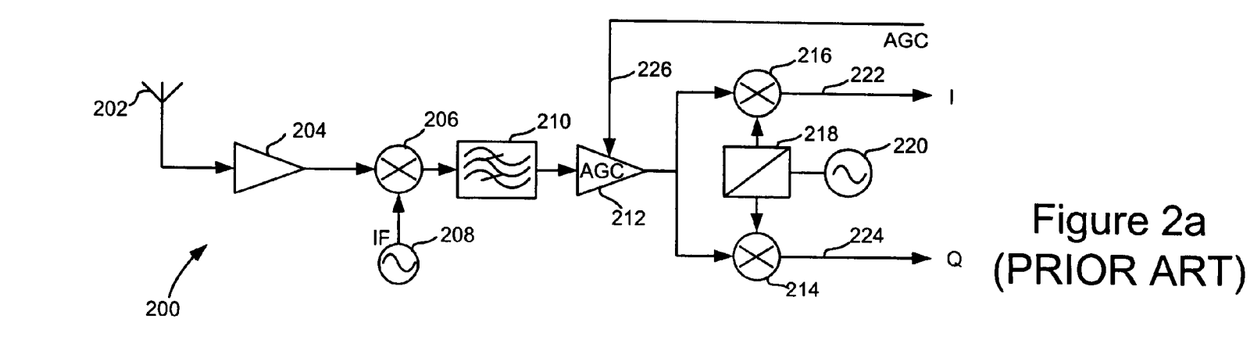
FIGS. 2a and 2b show, respectively, a receiver front end, and signal processing blocks of a HIPERLAN 2 OFDM receiver.
Figure 2B:
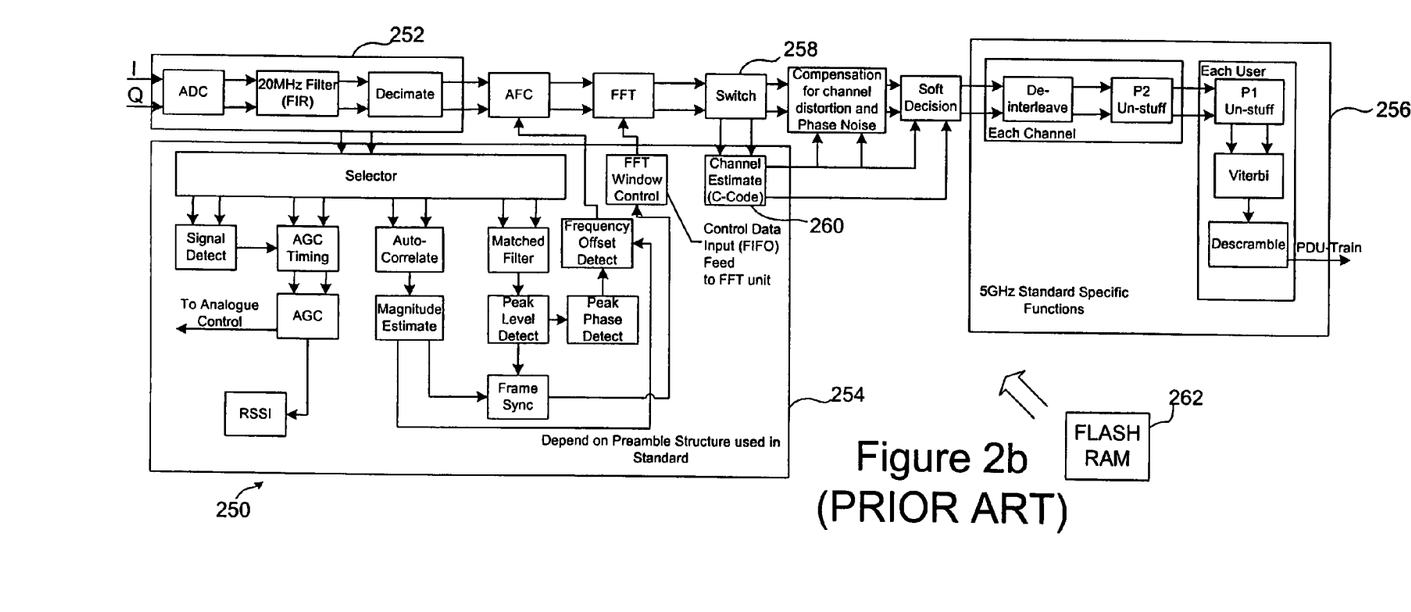

FIGS. 2a and 2b show, respectively, a receiver front end 200 and receiver signal processing blocks 250 of a HIPERLAN 2 mobile terminal (MT) OFDM receiver. The receiver 250 shows some details of the analogue-to-digital conversion circuitry 252, the synchronisation, channel estimation and control circuitry 252 and the de-packetising, de-interleaving and error correcting circuitry 256.

The front end 200 comprises a receive antenna 202 coupled to an input amplifier 204 and a mixer 206, which has a second input from an IF oscillator 208 to mix the RF signal to IF. The IF signal is then provided to an automatic Automatic Gain Control (AGC) amplifier 212 via a band pass filter 210, the AGC stage being controlled by a line 226 from control circuitry 254, to optimise later signal quantisation. The output of AGC 212 provides an input to two mixers 214, 216, which are also provided with quadrature signals from an oscillator 220 and splitter 218 to generate quadrature I and Q signals 222, 224. These I and Q signals are then over-sampled, filtered and decimated by analogue-to-digital circuitry 252. The over-sampling of the signal aids the digital filtering, after which the signal is rate reduced to the desired sample rate.

It is desirable (but not absolutely essential) to compensate for the effects of the transmission channel. This can be done using a known symbol, for example in preamble data or one or more pilot signals. In the receiver 250 of FIG. 2 a known preamble symbol, referred to as the "C symbol", is used to determine a channel estimate. The receiver synchronises to the received signal and switch 258 is operated to pass the received C symbol to channel estimator 260. This estimates the effect of the channel (amplitude change and phase shift of the symbols in the sub-carriers) on the known C symbol so that the effects of the channel can be compensated for, by multiplying by the reciprocal (or complex conjugate) of the channel response Alternatively the one or more pilot signals (which also contain known symbols) can be used to determine a channel estimate. Again the phase rotation and amplitude change required to transform the received pilot into the expected symbol can be determined and applied to other received symbols. Where more than one pilot is available at more than one frequency improved channel compensation estimates can be obtained by interpolation/extrapolation to other frequencies using the different frequency pilot signals.

In FIG. 2 the receiver front end 200 will generally be implemented in hardware whilst the receiver processing section 250 will often be implemented in "software", as illustrated schematically by Flash RAM 262 using, for example, ASICs, FPGAs or one or more DSP (digital signal processor) chips. A similar division between hardware and software will generally be present in the transmitter. However the skilled person will recognise that all the functions of the receiver of FIG. 2 (or of an equivalent transmitter) could be performed in hardware. Similarly the exact point at which the signal is digitised in a software radio will generally depend upon a cost/complexity/power consumption trade-off, as well as upon the availability of suitable high speed analogue/digital converters and processors, and that the RF signal could be digitised at IF or a higher frequency.

Figure 3:
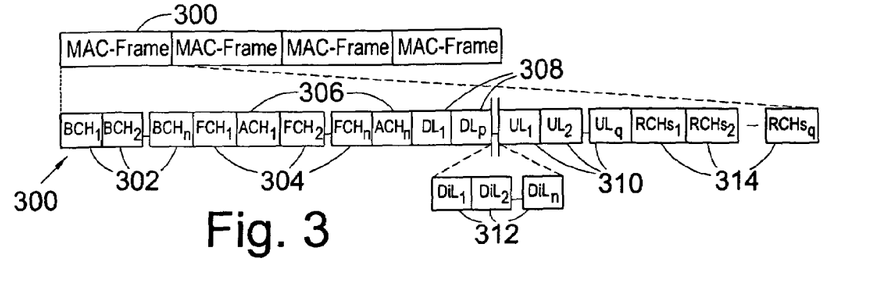
FIG. 3 shows an exemplary Media Access Control frame of a packet data communications system.
Figure 4:
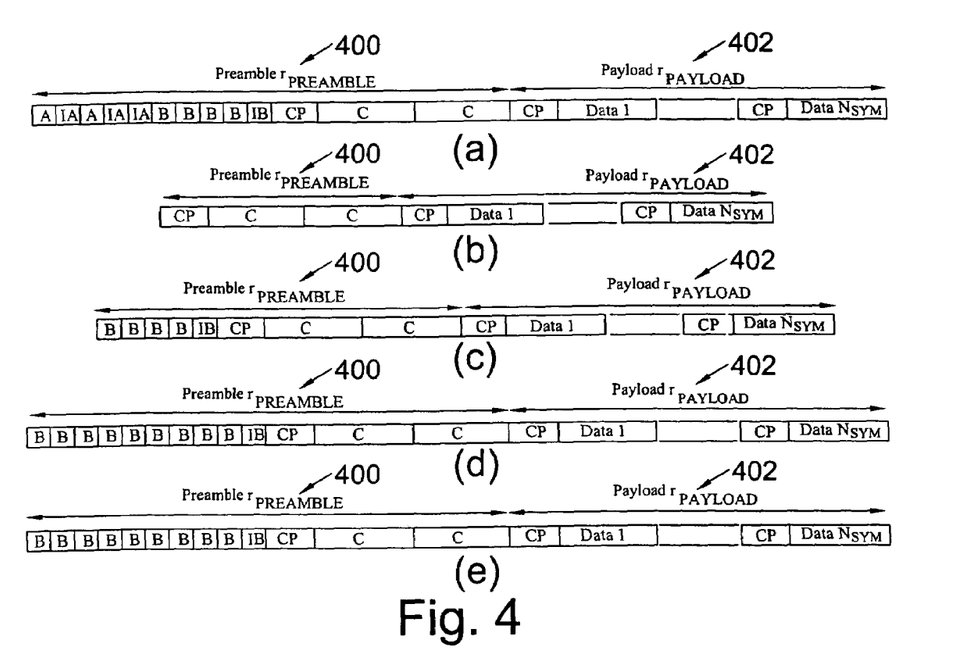
FIGS. 4a to 4e show, respectively, a broadcast burst, a downlink burst, an uplink burst with a short preamble, an uplink burst with a long preamble, and a direct link burst of a HIPERLAN 2 physical layer signal.

FIG. 3 shows an example of a Media Access Control (MAC) frame 300 of a packet data communications system including preamble sequences. The MAC frame includes a broadcast channel (BCH) burst 302, a frame channel (FCH) burst 304, an access feedback channel (ACH) burst 306, a down-link (DL) burst 308, an up-link (UL) burst 310, a direct link (DiL) burst 312, and a random access (RCH) burst 314, all of which contain a preamble sequence.

FIGS. 4a to e show, respectively, a broadcast burst, down-link burst, an uplink burst with a short preamble, uplink burst with a long preamble, and a direct link burst of a HIPERLAN 2 physical layer signal. Each of these bursts comprises a preamble portion 400 and a data payload portion 402. The preamble portions 400 comprise one or more of three basic OFDM symbols, denoted A, B and C. The values of these symbols are known and A and B (and, if desired, C) can be recovered in the time domain (pre-FFT). These symbols are generally used to establish the frame and frequency synchronisation and to set the FFT window for the data following the symbols; they may also be employed to control AGC stage 212. In the receiver of FIGS. 2A and B are recovered in the time domain and C is recovered in the frequency domain, that is post-FFT.

Figure 5:
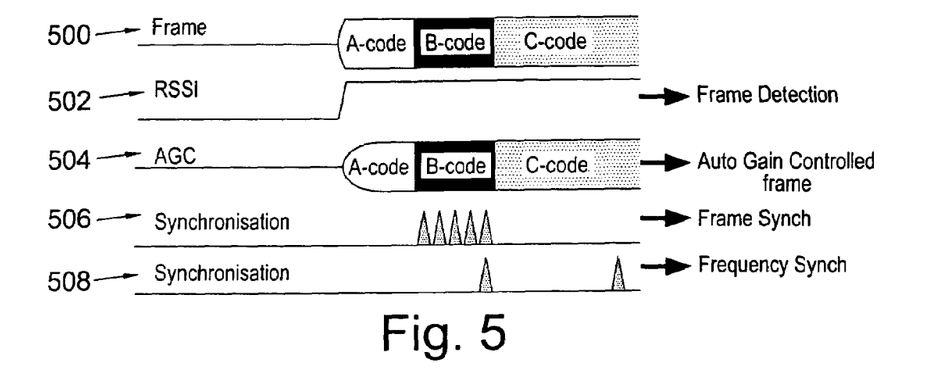
FIG. 5 shows, schematically, uses of the preamble portion of a HIPERLAN 2 broadcast burst in a mobile terminal OFDM receiver.

FIG. 5 illustrates, schematically, the use of these (known) preamble symbols for frame detection 502 based on RSSI (Received Signal Strength Indication), automatic gain control 504, frame synchronisation 506, and frequency synchronisation 508; a schematic illustration of the preamble portion of an MAC frame 500 is also illustrated for comparison.

Figure 6:
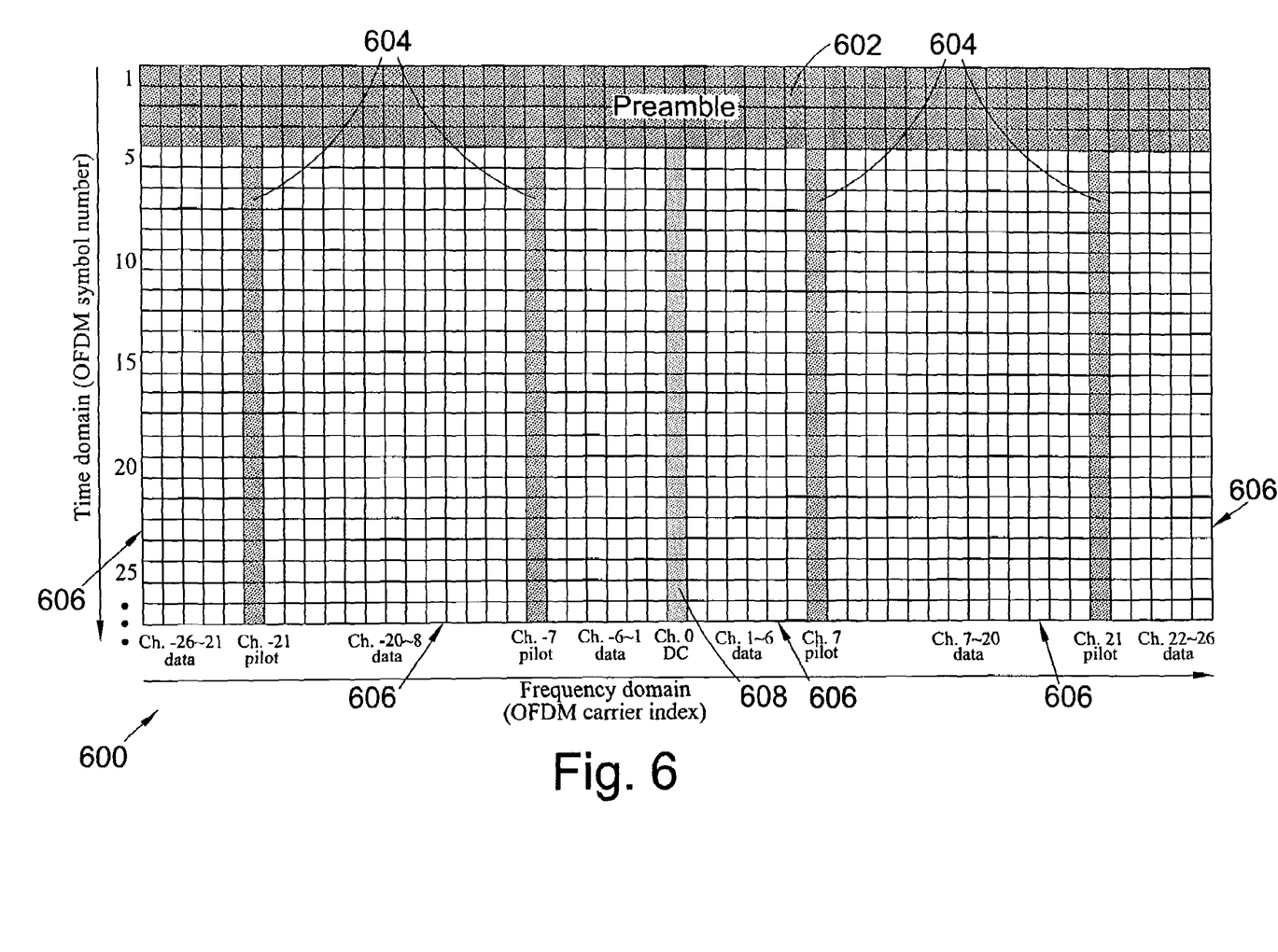
FIG. 6 shows a frequency-time plot of a HIPERLAN 2 OFDM signal including preamble and pilot signals.

FIG. 6 shows a plot 600 in the frequency and time domain illustrating the relative positions of preamble sequences 602, pilot signals 604, and data signals 606 for HIPERLAN 2, which has 48 data sub-carriers and 4 pilots (and one unused, central carrier channel 608). As can be seen from FIG. 6 the first four OFDM symbols comprise preamble data, and the pilot signals 604 continue to carry their preamble symbols. However on the remaining (data-bearing) sub-carriers OFDM symbols 5 onwards carry data. In other OFDM schemes similar plots can be drawn, although the preamble and pilot positions may vary (for example, the pilots need not necessarily comprise continuous signals).

It has previously been mentioned that OFDM is a useful technique for alleviating the effects of frequency selective fading caused by multipaths. However with particularly high data rates or in particularly severe multipath environments OFDM communications systems can still suffer from the effects of multipath fading. Moreover in indoor wireless environments, such as small office wireless LANs, there will often be a number of similar systems operating simultaneously in the same frequency band, because of limited spectrum availability. This can result in severe co-channel interference.

One technique which has been proposed for combatting such multipath and co-channel interference is the use of a sectorised transmit and/or receive antenna. The region to be covered is divided into a number of sectors, typically 3, 4 or 6, and one antenna (or more where diversity is employed) is provided for each sector, the patterns of the antennas being arranged to each cover mainly just one sector. In effect the main beam of each of the sector antennas points in a different direction and by selecting the transmit and/or receive direction the effects of multipath components and/or co-channel interference arriving from unwanted directions can be reduced. HIPERLAN 2, for example, supports the use of up to seven sectors at the Access Point. Some of the benefits of employing a sectorised switching array antenna in a HIPERLAN 2 environment are described in "Performance of HIPERLAN 2 using Sectorised Antennas" A. Dufexi, S. Armour, A. Nix, P. Karlsson and D. Bull, IEE Electronics Letters 15 Feb. 2001, volume 37 no. 4, page 245.

Another approach employed to mitigate the effects of multipath and co-channel interference uses a beamforming antenna array, such as a linear array of antenna elements in which the inter-antenna spacing is approximately one half a (carrier) wavelength. Signals from the antennas are combined, with appropriate phase and amplitude weightings, to provide a combined response with one or more lobes or beams. An array comprising n elements can be arranged to provide up to n−1 beams.

There are a number of different beamforming algorithms which may be applied to such an adaptive antenna array and details of these will be well known to the skilled person. One commonly used algorithm is the Constant Modulus Algorithm (CMA), described in J. R. Treichler and B. G. Agee, "A New Approach to Multipath Correction of Constant Modulus Signals", IEEE Trans. Acoust. Speech and Signal Process., vol. ASSP-31, no. 2, page 459, 1983, which is hereby incorporated by reference. Broadly speaking this algorithm iteratively determines the weights for combining the signals from the antenna elements based upon a cost function chosen to make the spectrum of the combined signals approximately flat. The phase angles of the weights are chosen so that the beams point in the direction of maximum signal power, or, alternatively, so that nulls are formed in the directions of the unwanted multipath components or co-channel interference.

Determining appropriate weights for the antenna array elements is relatively straightforward in a narrow band system but in an OFDM receiver, where the bandwidth occupied by the group of sub-carriers is normally >1 MHz and in many cases >10 MHz, a single set of weights is unlikely to be optimal across the entire bandwidth and may only be valid, for example, at the centre of the frequency band. This can be understood, for example, from the consideration that the antenna element spacing, in terms of fractions of a sub-carrier wavelength, varies across the OFDM frequency band. In the receiver of FIG. 1 adaptive array weights may be applied at points 168, 170, or 172 but applying the array weights at positions 168 or 170 (pre-FFT) will not normally result in a good set of estimated weights across the frequency band.

Figure 7:
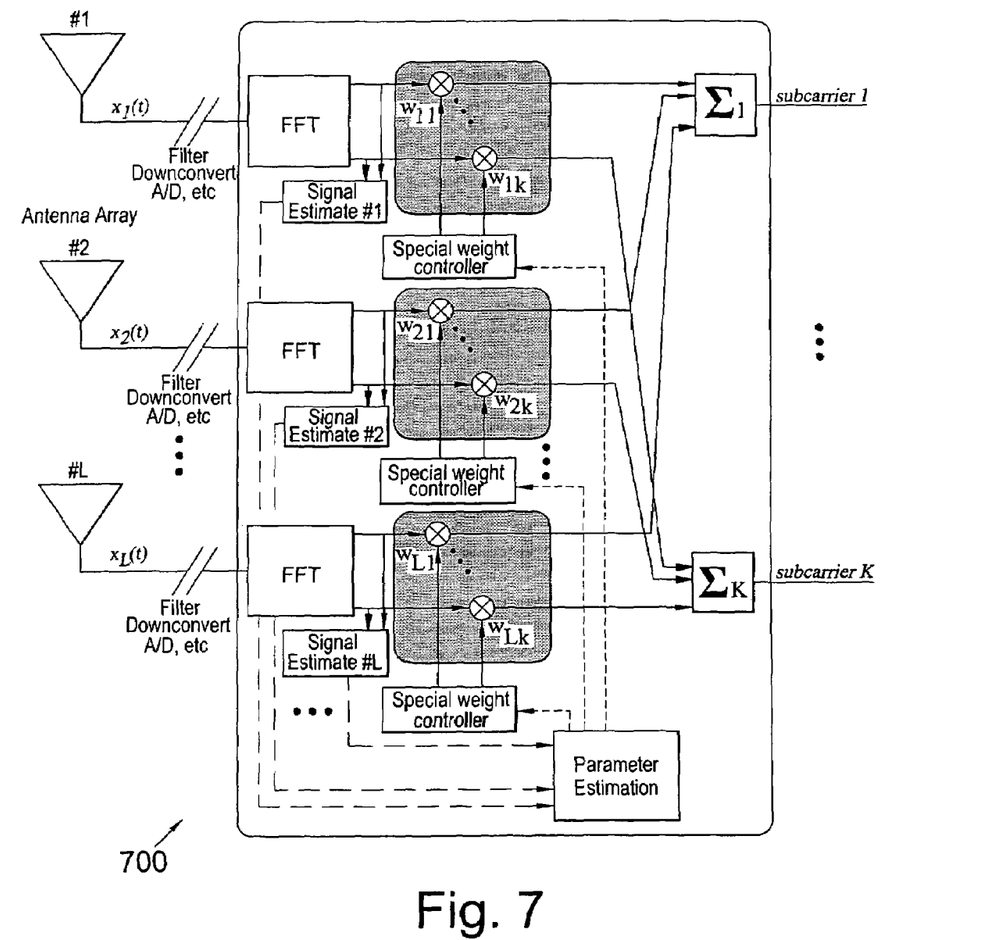
FIG. 7 shows an OFDM receiver in which a separate set of weights is applied to each sub-carrier in the frequency domain.

One solution to this problem is therefore to apply weightings after the FFT, at point 172, where different sets of weights can be applied to each sub-carrier. FIG. 7 shows an OFDM receiver 700 in which a separate set of weights is applied to each sub-carrier in this way. However it will be appreciated that with K sub-carriers and L antenna elements a total of K×L weights must be determined, which is a lengthy and processor-intensive task adding considerably to the receiver complexity. EP 0 852 407 describes an arrangement in which an operational band is partitioned into four equal sub-bands, one set of weights being calculated for each sub-band rather than for each sub-carrier, to reduce the number of weights to be calculated. However this is still a relatively complicated procedure and, moreover, produces a sub-optimal result. An alternative approach is described in Fujimoto et al, "A Novel Adaptive Array Utilising Frequency Characteristics", IEICE Trans. Commun., vol. E 83-B, no. 2 February 2000, page 371, which is hereby incorporated by reference, in which the post-FFT separated sub-carriers are used to determine a single set of pre-FFT time domain weights using CMA. This approach provides a considerable simplification of the weight determining procedure but, again, the weights are sub-optimal.

The above-described sectorised antennas select a sector (or direction) which maximises received power. However in an environment where there is co-channel interference the received power from the interfering signal may be greater than that from the desired signal, in which case the antenna is controlled to point towards the interferer, worsening rather than improving the performance of the system. A particular difficulty arises in the context of OFDM symbols since these comprise a plurality of orthogonal carriers each of which is separately modulated with a datastream. As has been mentioned the conventional way to deal with such a signal is to transform it from the time (pre-FFT) into the frequency (post-FFT) domain where the signal processing is easier, but such a transformation imposes an undesirable overhead for a procedure such as selecting an element of a sectorised antenna, or beam-forming in an adaptive array. Therefore a need arises for simplified antenna techniques which are nevertheless capable of mitigating the effects of co-channel interference, in particular in difficult environments.

SUMMARY OF THE INVENTION

According to the present invention there is therefore provided a received signal selector for a received signal comprising a set of carriers, the received signal selector being configured for use with an antenna system comprising a plurality of antenna elements, the received signal selector comprising, a plurality of received signal inputs for receiving signals from the plurality of antenna elements, an interference detector for each of the received signal inputs, coupled to said received signal inputs to receive, from each input, a version of said received signal, and configured to provide an interference output for the set of carriers from each input, a selection controller configured to receive the interference output for each said input and having a control output, and a selector coupled to said received signal inputs and responsive to said control output to select one or more of said versions of said received signal for output.

The antenna system may comprise, for example, a sectorised antenna system or an array antenna. The received signal selector may be used in either a receiver, transmitter or transceiver and is preferably employed with OFDM signals. By effectively operating in the pre-FFT or time domain the complexity is significantly reduced as compared with prior art techniques, whilst still alleviating the influence of severe multipath and/or co-channel interference. This in turn facilitates a high data throughput and allows the capacity of a communications system in which the received signal selector is employed to be increased. Furthermore the relative simplicity of the structure enables the power consumption of baseband LSI (Large Scale Integration) components to be reduced as compared with prior art techniques, both in base stations and mobile terminals. Embodiments of the invention also facilitate real-time operation, even in very high clock speed systems.

The selector may select signals from one or more of the antenna elements based upon the detected level of interference on the signals from the elements, selecting signals from an element or elements with the least interference. Preferably, however, the antenna elements are selected based upon signal-to-interference (SIR), one or more elements with the greatest SIR being selected. Thus preferably a signal detector is also provided for each of the antenna elements, although the skilled person will appreciate that such an arrangement may be realised by sharing one detector between the antenna elements.

Preferably the signal and interference detectors operate in the time domain, that is before the received signal has been transformed from the time domain to a frequency domain. Preferably the subcarriers are substantially mutually orthogonal and preferably they comprise subcarriers of an OFDM signal.

The signal and interference detectors may provide separate signal and interference outputs or a combined signal and interference detector may provide a combined output comprising, for example, a signal-to-interference ratio. One signal and interference detector may be provided for each antenna element or, alternatively, a single signal and interference detector may be shared between the elements, for example on a time-multiplexed basis. The functions of the received signal selector may be implemented in hardware or in software or in a combination of the two.

Preferably the signal and interference detectors determine the strength of the wanted signal and unwanted interference using a correlation technique; they may share a correlator or have separate correlators. To determine a measure of the interference to a received signal from one of the antenna elements the signal may be correlated with a first reference signal. This first reference signal is chosen to be substantially orthogonal to a known portion of the transmitted signal, such as a preamble sequence. To determine received signal strength the received signal may be correlated with a second reference signal which substantially corresponds to a known portion of the transmitted signal, again such as a preamble sequence.

Where the cross-correlation period (that is the position of the correlation window) is substantially the same for the signal strength detection and interference detection processes the first and second reference signals will be substantially mutually orthogonal. However this will not be the case where the cross-correlation periods are different, for example where preamble B is used for interference detection and preamble C is used for signal strength detection. (In this example the first reference signal, for determining the interference level, is orthogonal to the known preamble B and the second reference signal, for determining the signal strength, comprises preamble C itself).

The correlation is performed in the time-domain—that is the correlation is between two OFDM symbols and hence an inverse Fourier transform is performed on the known (preamble or pseudo-noise) data prior to the correlation. Preferably, therefore, the received signal selector includes a signal generator to generate the first and second reference signals. In most cases the receiver will know the preamble sequences used by the transmitter and the first and second reference signals can be generated from this information. However where this is not the case the receiver can estimate a preamble or pilot portion of the signal (or use blind algorithms) and generate the reference signals from that. The frequency domain signals will generally be known and time domain preamble sequences can therefore be generated using an IFFT. However this need not be performed in real-time and instead, for example, the relevant time domain preamble sequences can be predetermined and stored, say, in a look-up table.

In one implementation the antenna elements are directional antenna elements, for example elements of a sectorised antenna, and one version of the received signal is obtained from each antenna element. Alternatively signals from the antenna elements may provide inputs to a beamformer, such as a Butler matrix-type beamformer, which in turn provides the versions of the received signal to the interference detector and to the selector. In this latter case each version of the received signal will, in general, comprise a combination of the signals from all the antenna elements. However there is generally still a version of the received signal for each antenna element, that is the number of versions of the received signal generally corresponds to the number of antenna elements. Where beamforming is employed omnidirectional rather than directional antenna elements may be used.

The different versions of the received signals provide a degree of spatial diversity since, whether directional antenna elements or beamforming is employed, in general they will have arrived from different directions. The selection controller may be configured to select only one version of the received signal for further processing, preferably that with the greatest signal-to-interference ratio (SIR). Alternatively the selection controller may select more than one version of the received signal, again preferably those versions with the greatest signal-to-interference ratio. In other embodiments selection may be based upon the interference (aiming to minimise this) rather than upon the SIR, particularly where the level of interference is low.

Where the selection controller selects more than one version of the received signal these different versions may be combined. A conventional diversity technique may be employed for this, for example MRC (maximal ratio combining) to maximise the signal to noise ratio, or LMS (least mean squares), RLS (recursive least squares) or SMI (sample matrix inversion) for minimum mean square error (MMSE).

In a related aspect the invention provides an OFDM receiver for use with an antenna system comprising a plurality of directional antenna elements, the OFDM receiver having a plurality of inputs for said plurality of antenna elements and including a Fourier transform OFDM demodulator, the OFDM receiver further comprising a pre-Fourier transform domain signal and interference detector for each said antenna element, an element selection controller to receive signal and interference measures for each said antenna element from said signal and interference detector; and an antenna element selector responsive to said element selection controller to select signals from said antenna elements for demodulation by said OFDM demodulator. Again the antenna system may comprise, for example, a sectorised antenna or an array antenna system.

The invention also provides a method of selecting one or more received signals from an antenna system comprising a plurality of antenna elements, each said received signal comprising a set of carriers, the method comprising, determining an interference measure for the set of carriers comprising each said received signal, and selecting one or more of said received signals from said antenna elements using said interference measures.

The antenna system may comprise, for example, a sectorised antenna system or an array antenna. Preferably the carriers are substantially mutually orthogonal. Preferably the method comprises determining a signal-to-interference ratio for the set of carriers received by each antenna element; and selecting one or more of said antenna elements using said signal-to-interference ratios.

In a further aspect the invention provides a data carrier carrying processor control code to implement the above-described received signal selectors, receiver and methods. This processor control code may comprise computer programmed code, for example to control a digital signal processor, or other code such as a plurality of register values to set up a general purpose integrated circuit to implement the selector or method. The data carrier may comprise a storage medium such as a hard or floppy disk, CD- or DVD-ROM, or a programmed memory such as a read-only memory, or an optical or electrical signal carrier. As the skilled person will appreciate the processor control code may be also be distributed between a plurality of coupled components, for example on a network. The skilled person will further recognise that the invention may be implemented by a combination of dedicated hardware and functions implemented in software.

These and other aspects of the invention will now be further described, by way of example only, with reference to the accompanying figures in which:

BRIEF DESCRIPTION OF THE DRAWINGS

FIGS. 9a and 9b show, respectively, a schematic diagram of a signal and interference detector, and a schematic diagram of a signal generator for the signal and interference detector of FIG. 9a;

DETAILED DESCRIPTION

Figure 8:
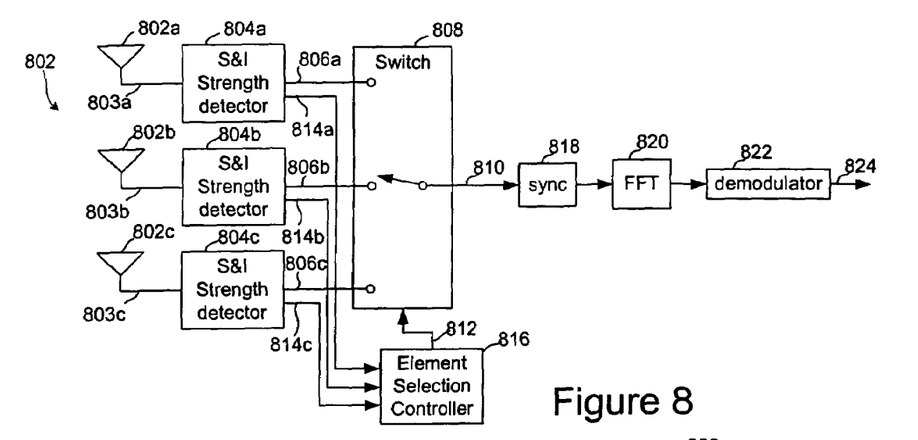
FIG. 8 shows a schematic diagram of a received signal selector according to an embodiment of the present invention.

Referring to FIG. 8, this shows a schematic diagram of a received signal selector 800 according to an embodiment of the present invention. A sectorised or array antenna 802 comprises a plurality of antenna elements 802a, b, c each coupled to a respective input 803a, b, c of a signal and interference strength detector 804a, b, c. Other conventional components such as downconverters and filters may be present between the antenna elements and the signal and interference strength detectors but, for simplicity, these are not shown. Each signal and interference strength detector has a first output 806a, b, c comprising a straight through version of the input signal, optionally buffered or amplified. These first output signals are provided to a switch or selector 808 which selectively provides one (or in other embodiments, more than one) of these signals to an output 810 (or to a set of outputs 810) in response to a control signal 812.

Each signal and interference strength detector also has a second pair of outputs 814a, b, c (shown as a single output) comprising a signal strength output and an interference strength output. Each of these pairs of outputs is provided to an element selection controller 816 which outputs a control signal 812 for selector 808. The element selection controller uses the information relating to the (desired) signal strength and interference strength from each antenna element to select one or more of the elements based upon a selection rule.

In the embodiment of FIG. 8 the element selection controller 816 controls selector 808 to select the received signal which has the largest power (or strength) ratio of desired signal to interference. In a variant, which is particularly suitable for low interference conditions, the signal with the least interference may be selected.

The output 810 is then processed in a conventional manner, as previously described. Thus, in outline, a synchronisation process 818 is applied to determine a Fourier transform window, a Fourier transform process 820, preferably an FFT process, is then applied to demodulate a received OFDM symbol and a demodulator 822 then demodulates output data 824 from the Fourier transformed OFDM symbol. Again, for simplicity, other features of the OFDM receiver, such as analogue-to-digital Conversion, are not shown.

Figure 9A:
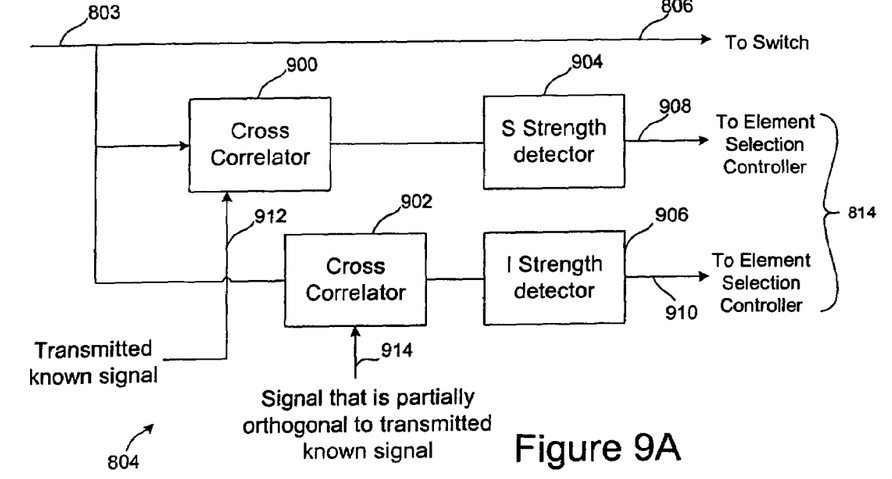

FIG. 9a illustrates an exemplary signal and interference detector 804 for the received signal selector 800 of FIG. 8. The input signal on line 803 is provided to first and second cross-correlators 900, 902, the outputs of which are provided to a signal strength detector 904 and to an interference strength detector 906 respectively to provide signal 908 and interference 910 strength outputs (together comprising a pair of outputs 814) to the element selection controller 816. Cross-correlator 900 cross-correlates the input signal with a known reference signal comprising a time-domain OFDM signal generated, for example, from a packet data frame preamble sequence. Cross-correlator 902 cross-correlates the input signal with a signal which is at least partially orthogonal to the known reference signal, and thus extracts an interference component from the input signal, as will be explained in more detail below.

Where the reference signal is derived from a preamble data sequence the output of the signal and interference strength detector 804 will only be valid when the preamble sequence is present. In this case the cross-correlators 900, 902 may be arranged to operate over a time window during which the preamble sequence is present determined, for example, by the synchronisation process 818. The signal and interference detection operation may be carried out at the beginning of data reception and/or every successive packet, or frame-by-frame. Alternatively one or more pilot signals transmitting a known data sequence substantially continuously may be extracted from the received signal and used in the cross-correlation process.

Figure 9B:
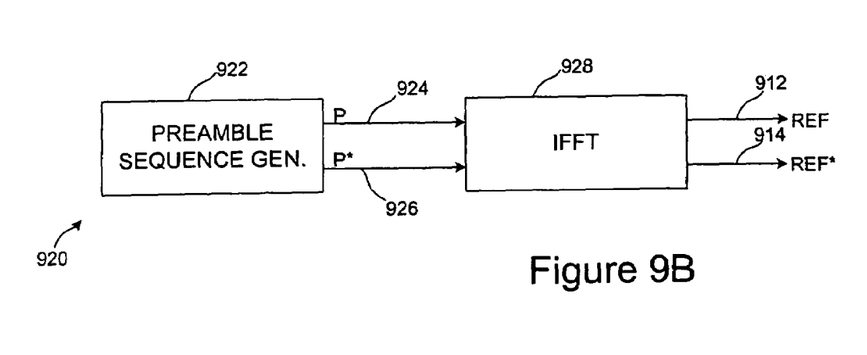

FIG. 9b shows an exemplary signal generator 920 for providing the reference and orthogonal reference signals 912, 914. The signal generator 920 comprises, in the illustrated example, a preamble sequence generator 922, to generate a preamble sequence 924 and a signal 926 orthogonal to the preamble sequence. These two signals are then inverse fast Fourier transformed by IFFT 928 to provide reference signals 912 and 914. In a HIPERLAN 2 system the preamble sequence p may be generated using the polynomial $s(x)=x^7+x^4+1$ with an initial all ones state, replacing all "1"s with −1 and all "0"s with the number 1.

Since the preamble sequence(s) and IFFT parameters are normally known the IFFT need not be performed in the receiver. For example, appropriate time-domain preamble sequences may be calculated in advance and stored in a look-up table in the receiver.

The operation of the signal and interference detector may be understood by considering a signal (R+I) where R is a known reference symbol and I is an interference contribution. The correlation of (R+I) with R is proportional to $R^2$, that is the result is a measure of the desired signal strength, assuming that the cross-correlation between the reference signal and the interference is low. The cross-correlation between (R+I) and R*, where R* is a signal substantially orthogonal to R, is equal to the cross-correlation of R* with I as the cross-correlation of R* with R is by definition zero. The cross-correlation of R* with I is a measure of the interference strength. Thus the outputs from the signal and interference strength detector 804 can be used to calculate a form of signal-to-interference ratio, which can then be used by the element selection controller 816 to select one or more antenna elements receiving signals with the least interference to the desired signal.

The correlation of two orthogonal sequences may be referred to as a zero-value-correlation, in mathematical terms, $$\sum_{i=1}^{N} a_i * b_i = 0; \quad \text{(Equation 1)}$$

where, $a_i$ is the first correlation sequence and $b_i$ is the second correlation sequence (both of length N). When the second correlation sequence is correlated with noise or co-channel or multipath interference the result is non-zero. The sequence $a_i$ is inserted into the data frame, for example, in the preamble.

One way to format a zero-value-correlated sequence is from a pair of highly correlated sequences. A highly correlated sequence has the property:

$$R_{xx}(n) = \begin{cases} 1, & n = 0 \\ 0, & n = \pm 1, \pm 2, \pm 3, \pm 4, \ldots \end{cases} \quad \text{(Equation 2)}$$

By combining a pair of this kind, zero-value-correlation sequences can be defined. Total received signal energy can be found by calculating the received power, and one measure of the level of unwanted interference energy is indicated by the peak level of the zero-value-correlated signal.

Figure 10:
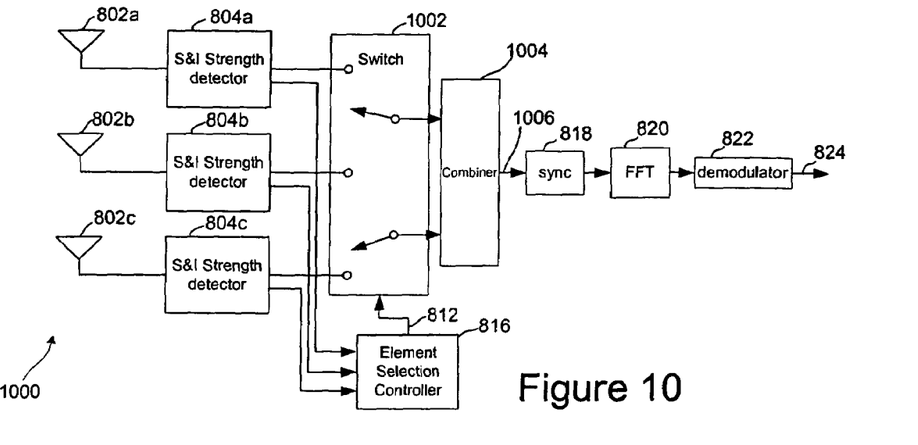
FIG. 10 shows a schematic diagram of a received signal selector according to a second embodiment of the present invention.

FIG. 10 shows a first alternative embodiment of a received signal selector 1000, in which similar features to those of the received signal selector 800 of FIG. 8 are indicated by like reference numerals.

In FIG. 10 the element selection controller 816 controls selector 1002 to select two or more received signals, preferably those with the greatest signal to interference ratio, but alternatively those with the least interference. The selected signals are then combined, in a combiner 1004, using an appropriate diversity method, such as maximal ratio combining (MRC). Optionally the signals for combining may be weighted according to a signal quality measure such as signal strength, interference level or, preferably, signal-to-interference ratio. The combined output 1006 from combiner 1004 takes the place of output 810 in the selector 800 of FIG. 8.

The combiner forms a weighted combination of the signals from two or more antenna elements, for example based upon their determined signal strength or signal-to-interference ratio. The applied weights comprise an amplitude and phase value for each combined signal and, for MRC, these are selected to coherently combine the signals from the antenna elements. In MRC a weight may be determined from the complex conjugate of the channel response for the relevant antenna element.

The skilled person will recognise that any conventional diversity combining method may be employed. Alternatively combiner 1004 may implement an adaptive beamforming algorithm such as SMI (sample matrix inversion), although this is more complicated. Estimates of the weights may be derived, for example, using the pilot signals.

In the embodiment of FIG. 10 the two or more received signals selected are received by two or more corresponding antenna elements but in an alternative arrangement, described next, these signals may instead be selected from outputs of a beamformer.

Figure 11:
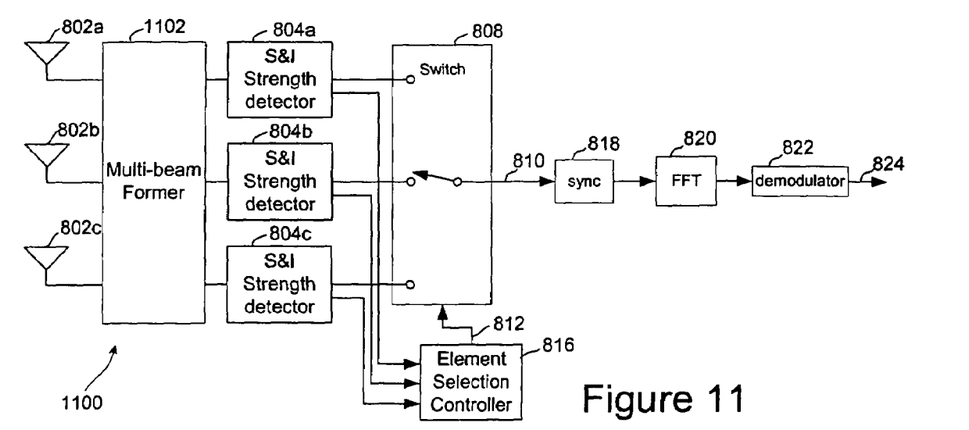
FIG. 11 shows a schematic diagram of a received signal selector according to a third embodiment of the present invention.

FIG. 11 shows a further alternative embodiment of a received signal selector 1100, again in which similar features to those of the received signal selector 800 of FIG. 8 are indicated by like reference numerals. In the embodiment of FIG. 11 the directional antenna elements 802a,b,c are replaced by less directional or omnidirectional elements and a beamformer 1102 is used to provide directionality. The effect is similar to that of a sectorised antenna but provides greater flexibility. The physical configuration of a sectorised antenna, and in particular the directions in which the elements point, is fixed at the time of installation. By contrast using a beamforming approach with two or more antenna elements allows the formation of flexible beam patterns with directional lobes.

The beamformer 1102 operates differently to an adaptive beamformer with only a single output in that the beamformer has a plurality of outputs, preferably one for each of the antenna elements to which it is connected—three outputs corresponding to the three antenna elements in the illustrated embodiment. Each output is formed from a combination of the input signals and is characterised by a directional response. Thus in the illustrated embodiment three different directional responses are provided for the antenna system. It will be recognised that not all the outputs from the beamformer need be used and that, more generally, the number of outputs from the beamformer may be more (or fewer) than the number of antenna elements.

Suitable beamforming methods, some of which have been mentioned above, include analogue beamforming methods such as a Butler matrix method, and equivalent digital beamforming methods such as Fourier transform methods. These and other methods are described in more detail in J. E. Hudson, "Adaptive Array Principles", Peter Peregrinus Limited, 1981, which is hereby incorporated by reference.

A multiple-beam beamforming network is sometimes known as a beamforming matrix, and the Butler matrix a well-known and simple example. A Butler matrix comprises a matrix of cascaded hybrid junctions and phase shifters linking a plurality of input ports to a plurality of output ports. Each output port is coupled to all the input ports, each output comprising a combination of signals from the input ports to which a set of phase shifts, determining a beam direction, has been applied. In general, although the beams may overlap they are mutually orthogonal. Beamforming networks, such as Butler matrix type networks, are available as off-the-shelf components from a range of suppliers.

In mathematical terms a beamforming network forming M beams may be characterised by an M-row matrix T, the output signal vector y(t) being related to the input signal vector u(t) by y(t)=T.u(t). Each column of T comprises a weight vector w and, where the beamforming network has M inputs for example for M antenna elements, T is an M×M matrix given by $T=[w_0, w_1, w_2 \ldots w_{M-1}]$. If the weight vectors w are orthogonal then so are the beams.

In a multiple-beam beamforming network such as a Butler matrix the beam directions may be changed by changing the phase shifts, for example by means of variable phase shifters. In embodiments of the invention, in a similar way to that in which elements of a sectorised antenna may be selected, the beams may be selected (or directed) according to received signal quality, for example so as to maximise the signal-to-interference ratio or minimise the interference.

Embodiments of the invention have been described in relation to a receiver but the invention may also be employed in a transmitter or in a transceiver. In a transmitter or transceiver the selection of one or more antenna elements for transmitting signals may be based upon the same criteria as in reception. For example, if the received signal-to-interference ratios indicate that a particular antenna element should be used for reception, this same element may also be used for transmission where the uplink (from mobile terminal to base station) and downlink channel (from base station to mobile terminal) properties are reciprocal. This is particularly the case where transmission and reception are at the same frequency, for example in a time division duplex (TDD) system. Transmitting in the direction(s) found to provide the optimum received signal will, because of reciprocity, tend to assist further in mitigating the effects of interference.

No doubt many effective alternatives will occur to the skilled person and the invention is not limited to the described embodiments but encompasses modifications within the spirit and scope of the attached claims.

We claim:

1. A received signal selector for a received orthogonal frequency division multiplexed (OFDM) signal comprising a set of OFDM carriers, the received signal selector being configured for use with an antenna system comprising a plurality of antenna elements, the received signal selector comprising:
  a plurality of received signal inputs for receiving signals from the plurality of antenna elements;
  a reference signal generator for generating a generated first reference OFDM signal;
  an interference detector for each of the received signal inputs, coupled to said received signal inputs to receive, from each input, a version of said received OFDM signal, and configured to provide an interference output for the set of OFDM carriers from each input;
  wherein the interference detector comprises at least one cross-correlator configured to determine a correlation between at least a portion of a version of said received OFDM signal and said generated first reference OFDM signal to provide said interference output, said generated first reference OFDM signal being generated is substantially orthogonal to said at least a portion of a version of said received OFDM signal;
  a selection controller configured to receive the interference output for each said input and having a control output; and
  a selector coupled to said received signal inputs and responsive to said control output to select one or more of said versions of said received signal for output.

2. A received signal selector as claimed in claim 1 further comprising a signal detector for each of the received signal inputs, coupled to said received signal inputs to receive, from each input, a version of said received OFDM signal, and configured to provide a signal strength output for the set of OFDM carriers from each input, said selection controller being further configured to receive said signal strength output for each said input.

3. A received signal selector as claimed in claim 1, further comprising a signal detector for each of the received signal inputs, coupled to said received signal inputs to receive, from each input, a version of said received OFDM signal, and configured to provide a signal strength output for the set of OFDM carriers from each input, said selection controller being further configured to receive said signal strength output for each said input, the reference signal generator is further configured to generate a generated second reference OFDM signal and said signal detector comprises at least one cross-correlator to determine a correlation between at least a portion of a version of said received OFDM signal and said generated second OFDM reference signal to provide said signal strength output, said generated second reference OFDM signal being generated to be substantially the same as said at least a portion of a version of said received OFDM signal.

4. A received signal selector as claimed in claim 2 wherein said selection controller is configured to select one or more of said versions of said received OFDM signal dependent upon a signal strength to interference ratio determined using said signal strength and interference outputs.

5. A received signal selector as claimed in claim 4 wherein the selection controller is configured to select only a version of the received OFDM signal with the largest ratio of signal to interference.

6. A received signal selector as claimed in claim 3, wherein said selection controller is configured to select one or more of said versions of said received OFDM signal dependent upon a signal strength to interference ratio determined using said signal strength and interference outputs.

7. A received signal selector as claimed in claim 6 wherein the selection controller is configured to select only a version of the received OFDM signal with the largest ratio of signal to interference.

8. A received signal selector as claimed in claim 3, wherein said first and second generated reference OFDM signals are at least partially orthogonal to one another.

9. A received signal selector as claimed in claim 1 further comprising a beamformer, the beamformer having a plurality of inputs each for receiving an OFDM signal from one of the antenna elements, and a plurality of outputs each coupled to said received signal input.

10. A received signal selector as claimed in claim 9 wherein said beamformer is configured to implement a Butler matrix-type algorithm.

11. A received signal selector as claimed in claim 1 wherein the selection controller is configured to select a plurality of versions of the received OFDM signal.

12. A received signal selector as claimed in claim 11 further comprising a signal combiner to form a weighted combination of said plurality of versions of said received signal for output.

13. An OFDM receiver including a received signal selector according to claim 1.

14. A terminal incorporating a received signal selector according to claim 1.

15. A terminal incorporating an OFDM receiver according to claim 13.

16. An orthogonal frequency division multiplexed (OFDM) receiver for use with an antenna system comprising a plurality of directional antenna elements, the OFDM receiver having a plurality of received signal inputs for receiving received OFDM signals from said plurality of antenna elements and including a Fourier transform OFDM demodulator, the OFDM receiver further comprising:
  a reference signal generator for generating one or more generated reference OFDM Signals;
  a pre-Fourier transform domain signal and interference detector for each said antenna element, each pre-Fourier transform domain signal and interference detector comprising at least one cross-correlator to determine a correlation between at least a portion of a received OFDM signal and a generated reference OFDM signal to provide an interference output, said generated reference OFDM signal being generated to be substantially orthogonal to said at least a portion of a received OFDM signal, each pre-Fourier transform domain signal and interference detector being further configured to provide a signal strength output for said received OFDM signal;
  an element selection controller to receive signal and interference measures for each said antenna element from said signal and interference detector; and
  an antenna element selector responsive to said element selection controller to select OFDM signals from said antenna elements for demodulation by said OFDM demodulator.

17. A method of selecting one or more received orthogonal frequency division multiplexed (OFDM) signals from an antenna system comprising a plurality of antenna elements, the method comprising:
  receiving a received OFDM signal comprising a set of OFDM carriers,
  determining an interference measure for the set of OFDM substantially orthogonal carriers comprising each said received OFDM signal, comprising determining a correlation between at least a portion of a version of said received OFDM signal and a generated first reference OFDM signal, said generated first reference OFDM signal being generated to be substantially orthogonal to said at least a portion of a version of said received OFDM signal; and selecting one or more of said received OFDM signals from said antenna elements using said interference measures.

18. A method as claimed in claim 17, wherein the set of OFDM carriers of said generated first reference OFDM signal is modulated by known transmit data.

19. A method as claimed in claim 17 further comprising:
determining a signal strength for the set of OFDM carriers comprising each said received OFDM signal; and
wherein said selecting uses said interference measures and said signal strengths.

20. A method as claimed in claim 19 wherein said signal strength is determined by determining a correlation between at least a portion of a version of said received OFDM signal and a generated second reference OFDM signal, said generated second reference OFDM signal being generated to be substantially the same as said at least a portion of a version of said received OFDM signal.

21. A method as claimed in claim 20 wherein the set of OFDM carriers of said generated second reference OFDM signal is modulated by known transmit data.

22. A method as claimed in claim 20 wherein said generated first and second reference OFDM signals are at least partially mutually orthogonal.

23. A method as claimed in claim 19 further comprising determining a signal-to-interference ratio for the set of OFDM carriers comprising each said received OFDM signal, and wherein said selecting selects according to said signal-to-interference ratios.

24. A method as claimed in claim 23 wherein said signal-to-interference ratio is determined in a pre-Fourier transform signal processing domain.

25. A method as claimed in claim 24 wherein said selecting selects only a received OFDM signal with the largest signal-to-interference ratio.

26. A method as claimed in claim 23 wherein said selecting selects only a received OFDM signal with the largest signal-to-interference ratio.

27. A method as claimed in claim 17 further comprising applying a beamforming algorithm to OFDM signals from said antenna elements to provide said received OFDM signals for said interference measure determining.

28. A method as claimed in claim 27 wherein said beamforming algorithm comprises a Butler matrix-type algorithm.

29. A method as claimed in claim 17 wherein said selecting selects a plurality of said received OFDM signals, the method further comprising forming a weighted combination of said received OFDM signals.

30. A computer readable storage medium storing processor control code which when executed by a processor results in performance of steps comprising:
receiving a received OFDM signal comprising a set of OFDM carriers;
determining an interference measure for the set of OFDM substantially orthogonal carriers comprising each said received OFDM signal, comprising determining a correlation between at least a portion of a version of said received OFDM signal and a generated first reference OFDM signal, said generated first reference OFDM signal generated to be substantially orthogonal to said at least a portion of a version of said received OFDM signal; and
selecting one or more of said received OFDM signals from said antenna elements using said interference measures.

31. A computer readable storage medium storing processor control code which when executed by a processor results in performance of steps comprising:
receiving orthogonal frequency division multiplexed (OFDM) signals from a plurality of antenna elements;
generating one or more generated reference OFDM signals;
determining a correlation between at least a portion of a received OFDM signal and a generated reference OFDM signal to provide an interference output. said generated reference OFDM signal generated to be substantially orthogonal to said at least a portion of a received OFDM signal;
providing a signal strength output for said received OFDM signal;
receiving signal and interference measures from each antenna element; and
selecting OFDM signals from said antenna elements for demodulation.

* * * * *